United States Patent
Gudem et al.

(10) Patent No.: US 9,118,396 B2
(45) Date of Patent: Aug. 25, 2015

(54) TUNABLE NOTCH FILTER USING FEEDBACK THROUGH AN EXISTING FEEDBACK RECEIVER

(71) Applicant: QUALCOMM Incorporated, San Diego, CA (US)

(72) Inventors: Prasad Srinivasa Siva Gudem, San Diego, CA (US); Ojas M Choksi, San Diego, CA (US); Wei Zhuo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/769,001

(22) Filed: Feb. 15, 2013

(65) Prior Publication Data

US 2013/0259102 A1 Oct. 3, 2013

Related U.S. Application Data

(63) Continuation of application No. 13/692,854, filed on Dec. 3, 2012.

(60) Provisional application No. 61/618,483, filed on Mar. 30, 2012.

(51) Int. Cl.
*H04B 1/38* (2006.01)
*H04L 5/16* (2006.01)
(Continued)

(52) U.S. Cl.
CPC ............... *H04B 1/44* (2013.01); *H04B 1/3805* (2013.01); *H04B 1/525* (2013.01); *H04B 17/354* (2015.01); *H04B 1/1036* (2013.01); *H04B 17/24* (2015.01)

(58) Field of Classification Search
CPC ............. H04W 52/48; H04W 52/50; H01L 2924/3011; H04B 1/525; H04B 1/0475
USPC .......... 375/219; 455/83, 73, 126, 63.1, 226.1, 455/81, 121, 193, 78; 370/278
See application file for complete search history.

(56) References Cited

U.S. PATENT DOCUMENTS 3,699,444 A 10/1972 Ghose et al.
4,747,160 A 5/1988 Bossard
(Continued)

FOREIGN PATENT DOCUMENTS

CN 102006102 A 4/2011
EP 2296286 A2 3/2011
(Continued)

OTHER PUBLICATIONS

Pursula et al. (Pekka Pursula et al., "Hybrid Transformer-Based Adaptive RF Front End for UHF RFID Mobile Phone Readers", 2008, IEEE, total of 6 pages).*
(Continued)

*Primary Examiner* — Sam K Ahn
*Assistant Examiner* — Fabricio R Murillo Garcia
(74) *Attorney, Agent, or Firm* — James Gutierrez

(57) ABSTRACT

A wireless communication device configured for reducing Tx leakage in a receive signal is described. The wireless communication device includes a transceiver chip. The transceiver chip includes a receiver, a feedback receiver and a transmitter. The wireless communication device also includes a Tx leakage signal reduction module. The Tx leakage signal reduction module reuses the feedback receiver.

33 Claims, 12 Drawing Sheets

(51) Int. Cl.
*H04B 1/44* (2006.01)
*H04B 1/3805* (2015.01)
*H04B 1/525* (2015.01)
*H04B 17/354* (2015.01)
*H04B 1/10* (2006.01)
*H04B 17/24* (2015.01)

(56) References Cited

U.S. PATENT DOCUMENTS

| | | | |
|---|---|---|---|
| 5,179,302 | A | 1/1993 | Wagner |
| 6,211,671 | B1 | 4/2001 | Shattil |
| 7,142,811 | B2 | 11/2006 | Terranova et al. |
| 7,236,802 | B2 | 6/2007 | Cairo |
| 7,372,327 | B2 | 5/2008 | Westwick et al. |
| 7,848,713 | B2 | 12/2010 | Cabanillas et al. |
| 8,005,448 | B1* | 8/2011 | Yan et al. ............ 455/226.1 |
| 8,090,044 | B2 | 1/2012 | Rofougaran |
| 8,208,865 | B2 | 6/2012 | Mikhemar et al. |
| 8,521,117 | B1 | 8/2013 | Gupta et al. |
| 2003/0022638 | A1 | 1/2003 | Imai et al. |
| 2003/0235160 | A1* | 12/2003 | Saifuddin ............ 370/326 |
| 2007/0105509 | A1 | 5/2007 | Muhammad et al. |
| 2008/0009257 | A1 | 1/2008 | Safarian et al. |
| 2008/0242245 | A1* | 10/2008 | Aparin ............ 455/126 |
| 2008/0303609 | A1 | 12/2008 | Abe et al. |
| 2009/0117855 | A1 | 5/2009 | Rofougaran |
| 2009/0156152 | A1 | 6/2009 | Sahota et al. |
| 2009/0186582 | A1* | 7/2009 | Muhammad et al. ........ 455/63.1 |
| 2009/0213770 | A1* | 8/2009 | Mu ............ 370/281 |
| 2009/0253385 | A1* | 10/2009 | Dent et al. ............ 455/83 |
| 2010/0029323 | A1 | 2/2010 | Tasic et al. |
| 2010/0080270 | A1* | 4/2010 | Chen et al. ............ 375/219 |
| 2010/0271987 | A1 | 10/2010 | Chiu et al. |
| 2010/0295629 | A1 | 11/2010 | Klemens et al. |
| 2011/0053525 | A1 | 3/2011 | Yi |
| 2011/0064005 | A1* | 3/2011 | Mikhemar et al. ............ 370/278 |
| 2011/0068636 | A1 | 3/2011 | Lee et al. |
| 2011/0128088 | A1 | 6/2011 | Jin et al. |
| 2011/0158135 | A1 | 6/2011 | Mikhemar et al. |
| 2012/0098549 | A1 | 4/2012 | Wang et al. |
| 2012/0188024 | A1 | 7/2012 | Yamanouchi |
| 2012/0295553 | A1 | 11/2012 | Sahota |
| 2013/0109330 | A1 | 5/2013 | Sahota et al. |
| 2013/0258911 | A1 | 10/2013 | Choksi |
| 2013/0259099 | A1 | 10/2013 | Gudem et al. |
| 2013/0343237 | A1 | 12/2013 | Mikhemar et al. |
| 2014/0085951 | A1 | 3/2014 | Kaeriyama et al. |

FOREIGN PATENT DOCUMENTS

| | | |
|---|---|---|
| EP | 2393211 A2 | 12/2011 |
| GB | 1123416 A | 8/1968 |
| WO | 2005050896 A2 | 6/2005 |
| WO | 2011104313 A1 | 9/2011 |

OTHER PUBLICATIONS

Mikhemar, et al., "A Tunable Integrated Duplexer with 50dB Isolation in 40nm CMOS," ISSCC 2009, paper 22.7, 2009, pp. 386-387.
Mikhemar, et al., "An On-Chip Wideband and Low-Loss Duplexer for 3G/4G CMOS Radios," IEEE Symposium on VLSI Circuits 2010, pp. 129-130.
Pursula, et al., "Hybrid Transformer-Based Adaptive RF Front End for UHD RFID Mobile Phone Readers," IEEE International Conference on RFID, 2008, pp. 150-155.
Sartori, Eugene F., "Hybrid Transformers," IEEE Transactions on Parts, Materials and Packaging, vol. 4, No. 3, Sep. 1968, pp. 59-66.
Sorsby et al. Practical High-Efficiency Partial-Envelope Tracking Power Amplifier System with Broadband Applications. IEEE Radio and Wireless Symposium (RWS) [Online] , pp. 104-107.(2010).
Wu et al. "A High IIP2 Gilbert Mixer-Based Downconverter Design for Direct-Conversion WiMAX Receivers". IEEE Radio and Wireless Symposium (RWS) [Online] pp. 404-407 (2010).
Darabi, et al., "Highly Integrated and Tunable RF Front Ends for Reconfigurable Multiband Transceivers: A Tutorial," IEEE Transactions on Circuits and Systems, Regular Papers, vol. 58, No. 9, Sep. 2011, pp. 2038-2050.
International Search Report and Written Opinion—PCT/US2013/034743—ISA/EPO—Jul. 3, 2013.

* cited by examiner

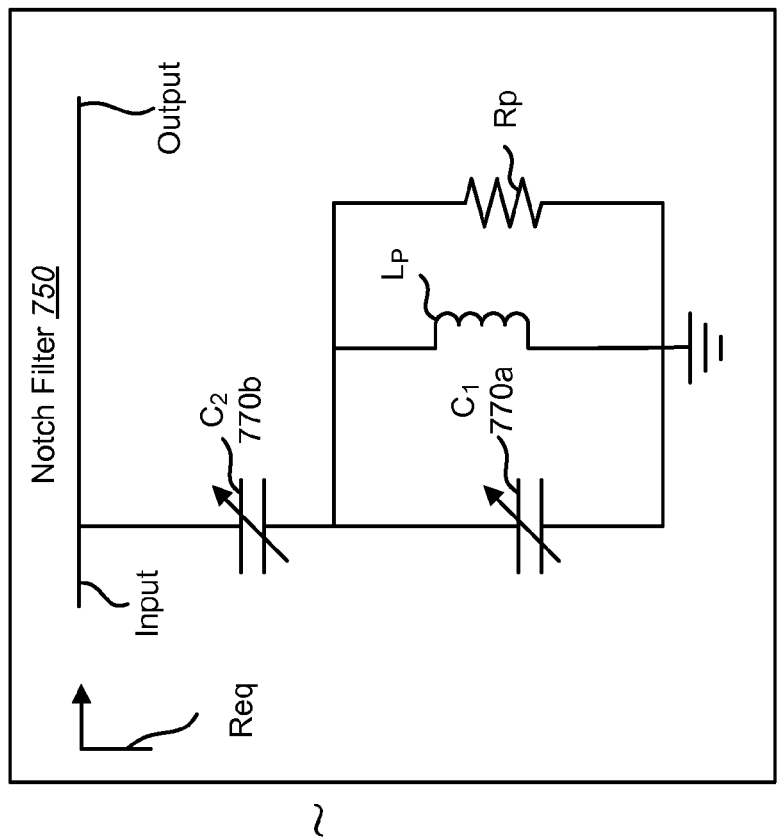
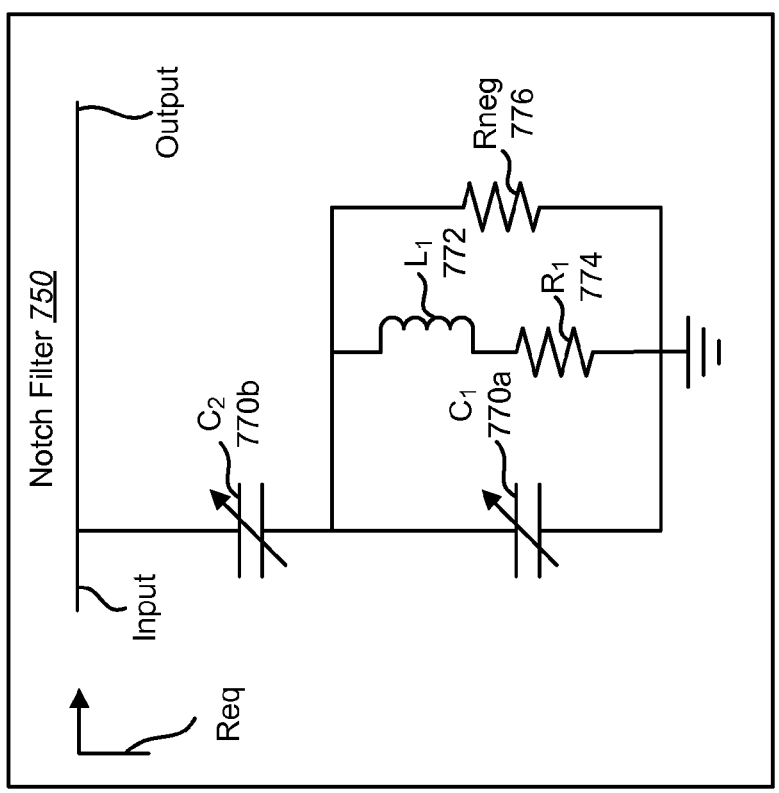
FIG. 7

TUNABLE NOTCH FILTER USING FEEDBACK THROUGH AN EXISTING FEEDBACK RECEIVER

CLAIM OF PRIORITY UNDER 35 U.S.C. §119

The present application for patent claims priority to Provisional Application No. 61/618,483, entitled "Tunable notch filter using feedback through an existing envelope tracking (ET) receiver" filed Mar. 30, 2012, and assigned to the assignee hereof and hereby expressly incorporated by reference herein.

The present application for patent claims priority to patent application Ser. No. 13/692,854, entitled "Tunable notch filter using feedback through an existing feedback receiver" filed Dec. 3, 2012, and assigned to the assignee hereof and hereby expressly incorporated by reference herein.

TECHNICAL FIELD

The present disclosure relates generally to wireless devices for communication systems. More specifically, the present disclosure relates to systems and methods for a tunable notch filter using feedback through an existing feedback receiver.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Electronic devices may transmit and receive wireless signals simultaneously. Because of the distance between an electronic device and a base station, wireless signals received by the electronic device may have considerably less amplitude than wireless signals transmitted by the electronic device. As such, portions of the transmit signal may leak onto the received signals, reducing the signal quality of the received signals. These leaked transmit signals may be filtered out. However, non-adaptive filters are limited in both the amount of signal removed and the frequency band of the signal removed. Benefits may be realized by using adaptive filters that adapt to the leakage signal that appears on the received signal.

SUMMARY

A wireless communication device configured for reducing Tx leakage in a receive signal is described. The wireless device includes a transceiver chip. The transceiver chip includes a receiver, a feedback receiver and a transmitter. The transceiver chip also includes a Tx leakage signal reduction module. The Tx leakage signal reduction module reuses the feedback receiver.

The Tx leakage signal reduction module may include a notch filter that reduces Tx leakage in the receive signal. The notch filter may be located on the transceiver chip. The notch filter may be coupled to an output of a low noise amplifier that receives the receive signal. The notch filter may instead be located off the transceiver chip. The notch filter may receive the receive signal. An output of the notch filter may be coupled to an input of a low noise amplifier on the transceiver chip.

The receiver may provide a feedback signal to the feedback receiver. The feedback receiver may provide a digital leakage reduction signal to the Tx leakage signal reduction module. The digital leakage reduction signal may tune a notch filter in the Tx leakage signal reduction module to minimize Tx leakage in the receive signal. The notch filter may include a first variable capacitor, a second variable capacitor, a first resistor, a second resistor and an inductor. The notch filter may be tuned to provide reliable rejection of Tx leakage across process, voltage and temperature. The digital leakage reduction signal may tune a balancing impedance in a hybrid transformer on the wireless communication device.

The hybrid transformer may include a first inductor, a second inductor and a third inductor. The balancing impedance may be coupled between the second inductor and ground. The feedback signal may be provided to a feedback downconverter in the feedback receiver by a first amplifier in a cascode stage in the receiver. An output of the feedback downconverter may be coupled to an analog-to-digital converter via a feedback baseband filter. An output of the analog-to-digital converter may be converted to the digital leakage reduction signal by a digital signal processor.

A method for reducing Tx leakage in a receive signal is also described. The receive signal is received. The receive signal is processed in a receiver. A feedback signal is provided from the receiver to a feedback downconverter. The feedback signal is converted to a digital leakage reduction signal using an analog-to-digital converter and a digital signal processor. The digital leakage reduction signal is used to reduce Tx leakage in the receive signal.

The feedback signal may be downconverted using the feedback downconverter. The downconverted feedback signal may be filtered using a feedback baseband filter. Processing the receive signal in the receiver may include passing the receive signal through a notch filter.

A measured notch frequency of the notch filter may be determined. A process error may also be determined. A first capacitor code and a second capacitor code may be calculated that meet requirements for a channel. The first capacitor code may be applied to the first variable capacitor and the second capacitor code may be applied to the second variable capacitor.

Determining a measured notch frequency of the notch filter may include applying a transmit tone on three different frequencies to the notch filter, measuring a DC gain through the feedback receiver, calculating a gradient and determining the measured notch frequency using a gradient search algorithm.

An apparatus for reducing Tx leakage in a receive signal is described. The apparatus includes means for receiving the receive signal. The apparatus also includes means for processing the receive signal in a receiver. The apparatus further includes means for providing a feedback signal from the receiver to a feedback downconverter. The apparatus also includes means for converting the feedback signal to a digital leakage reduction signal. The apparatus further includes means for using the digital leakage reduction signal to reduce Tx leakage in the receive signal.

A computer-program product for reducing Tx leakage in a receive signal is also described. The computer-program product includes a non-transitory computer-readable medium having instructions thereon. The instructions include code for causing a wireless communication device to receive the receive signal. The instructions also include code for causing the wireless communication device to process the receive signal in a receiver. The instructions further include code for causing the wireless communication device to provide a feedback signal from the receiver to a feedback downconverter. The instructions also include code for causing the wireless communication device to convert the feedback signal to a digital leakage reduction signal using an analog-to-digital converter and a digital signal processor. The instructions further include code for causing the wireless communication device to use the digital leakage reduction signal to reduce Tx leakage in the receive signal.

BRIEF DESCRIPTION OF THE DRAWINGS

FIG. 7 is a circuit diagram illustrating a notch filter;

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of $3^{rd}$ generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1x or 1xRTT refers to the core CDMA2000 wireless air interface standard. 1x more specifically refers to 1 times Radio Transmission Technology and indicates the same radio frequency (RF) bandwidth as used in IS-95. 1xRTT adds 64 additional traffic channels to the forward link. EV-DO refers to Evolution-Data Optimized. EV-DO is a telecommunications standard for the wireless transmission of data through radio signals.

Figure 1:
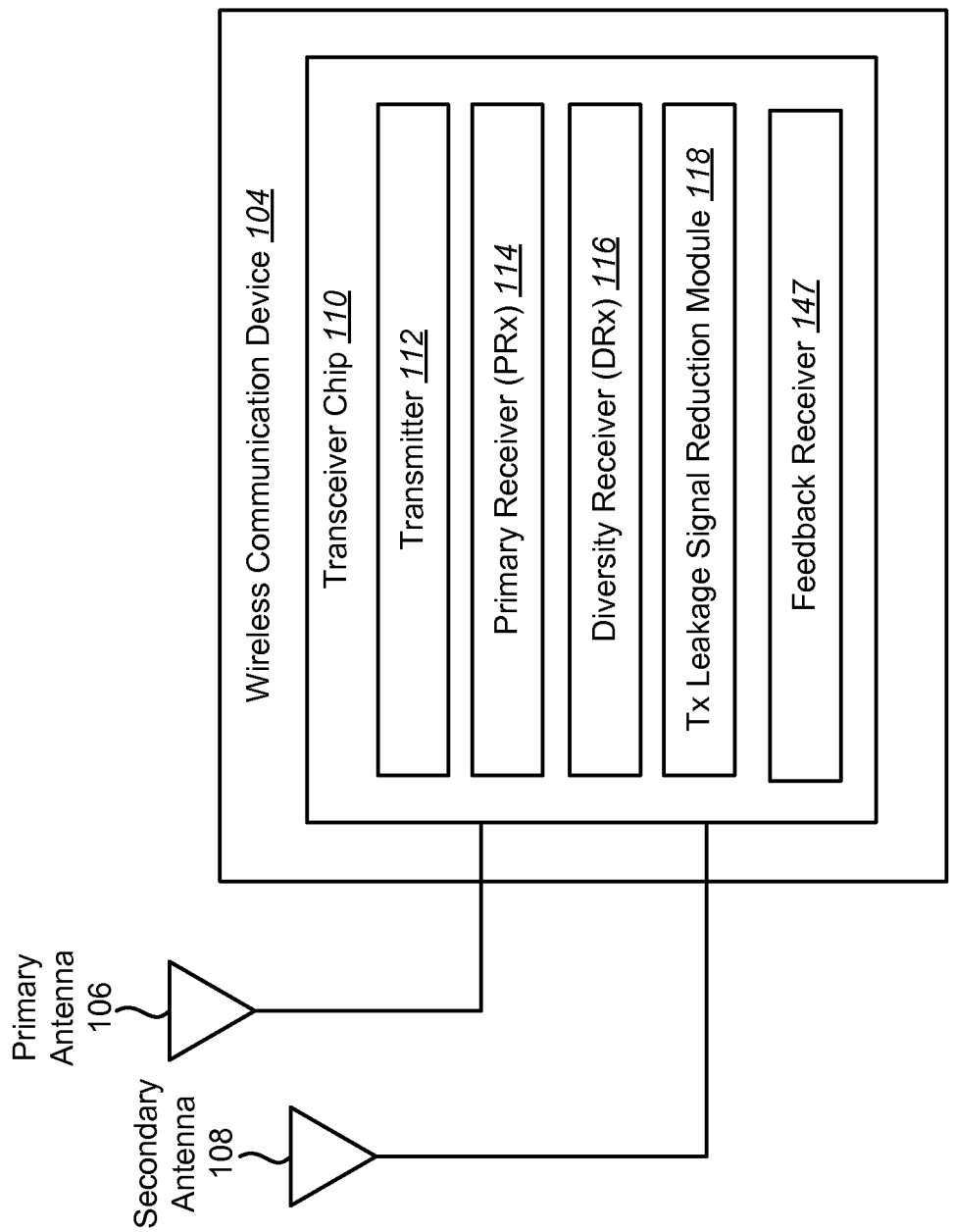
FIG. 1 shows a wireless communication device for use in the present systems and methods.

FIG. 1 shows a wireless communication device 104 for use in the present systems and methods. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a PC card, compact flash, an external or internal modem, a wireline phone, etc. A wireless communication device 104 may be mobile or stationary. A wireless communication device 104 may communicate with zero, one or multiple base stations on a downlink and/or an uplink at any given moment. The downlink (or forward link) refers to the communication link from a base station to a wireless communication device 104, and the uplink (or reverse link) refers to the communication link from a wireless communication device 104 to a base station. Uplink and downlink may refer to the communication link or to the carriers used for the communication link.

A wireless communication device 104 may operate in a wireless communication system that includes other wireless devices, such as base stations. A base station is a station that communicates with one or more wireless communication devices 104. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices 104. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3$^{rd}$ Generation Partnership Project (3GPP) Long Term Evolution (LTE) systems and spatial division multiple access (SDMA) systems.

The wireless communication device 104 may include a primary antenna 106 and a secondary antenna 108. In one configuration, the primary antenna 106 may be used for transmitting wireless signals and receiving a primary signal while the secondary antenna 108 may be used for receiving a secondary signal. Both the primary antenna 106 and the secondary antenna 108 may be coupled to a transceiver chip 110 on the wireless communication device 104.

The transceiver chip 110 may include a transmitter 112, a primary receiver (PRx) 114, a diversity receiver (DRx) 116, a feedback receiver 147 and a Tx leakage signal reduction module 118. The Tx leakage signal reduction module include a notch filter or an adjustable impedance. In one configuration, portions of the Tx leakage signal reduction module 118 may be located on the transceiver chip 110 while other portions of the Tx leakage signal reduction module 118 may be located off the transceiver chip 110.

In full duplex systems, wireless devices may transmit and receive simultaneously. The transmit frequency and the receive frequency may be separated to prevent interference. Typically, the transmit signal broadcast by a wireless device has a significantly larger amplitude than the signals received by the wireless device. This is due to the attenuation of wireless signals (i.e., received signals have attenuated during wireless travel while transmit signals need higher amplitude to ensure proper reception). For this reason, transmit signals often interfere with receive signals. The noise from the transmit signal that interferes with the receive signal may be referred to as the Tx leakage signal. It is desirable to reduce or eliminate the Tx leakage signal in the receive signal. The Tx leakage signal may be removed using filters. The Tx leakage signal reduction module 118 may reduce the amplitude of the Tx leakage signal using feedback while simultaneously improving the second order intercept point (IIP2) and Rx local oscillator (LO) phase noise requirements. It is desirable for the Tx leakage signal reduction module 118 to reuse an existing feedback receiver. In one configuration, the Tx leakage signal reduction module 118 may improve the second order intercept point (IIP2) without burning a significant amount of current.

In one configuration, the use of the Tx leakage signal reduction module may allow for the elimination of an external diversity surface acoustic wave (SAW) filter on the wireless communication device 104. Removing an external diversity surface acoustic wave (SAW) filter on the wireless communication device 104 may reduce the cost, size and power consumption of the wireless communication device 104.

Figure 2:
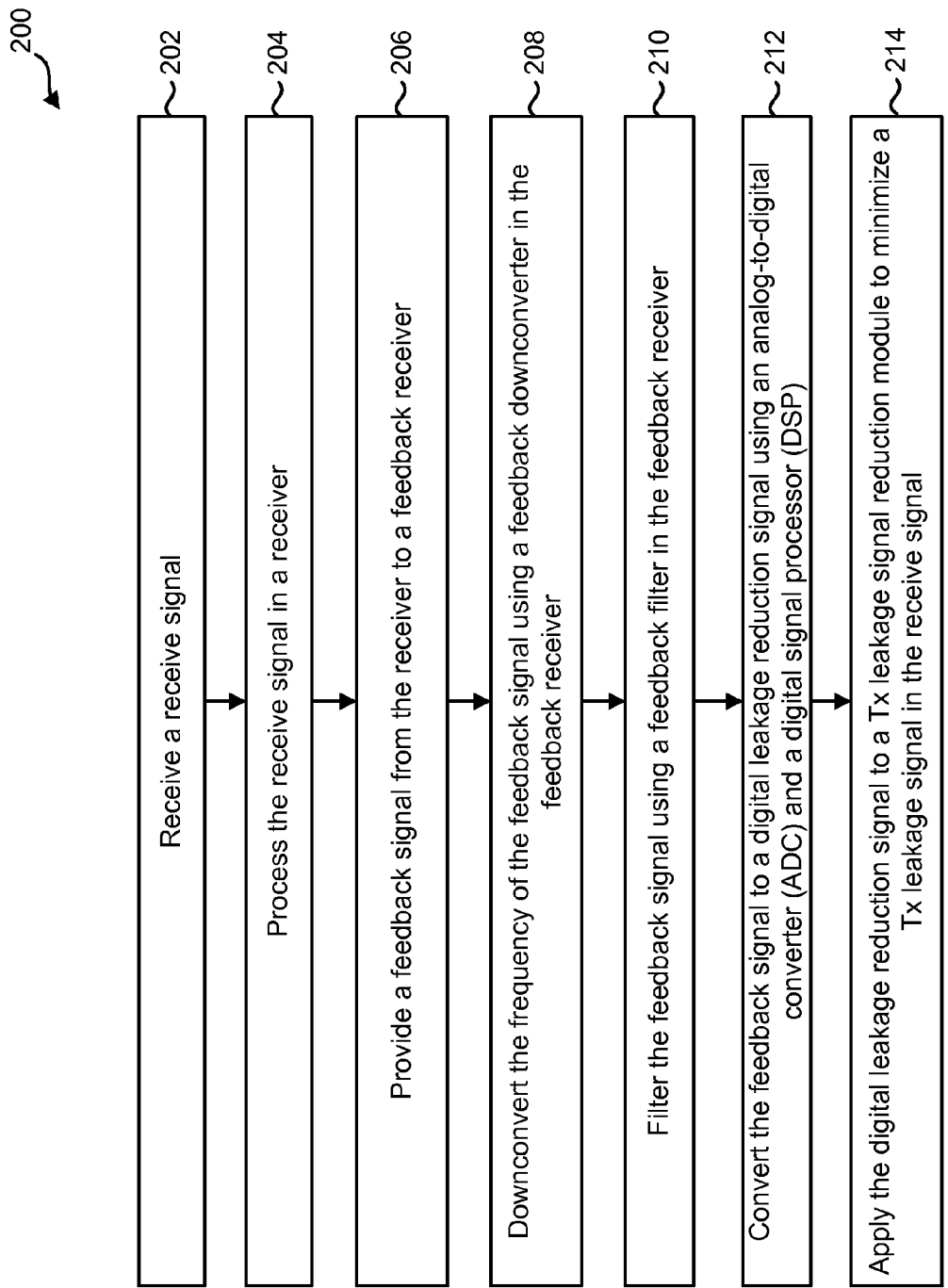
FIG. 2 is a flow diagram of a method for minimizing a Tx leakage signal in a primary receive signal.

FIG. 2 is a flow diagram of a method 200 for minimizing a Tx leakage signal in a primary receive signal. The method 200 may be performed by a wireless communication device 104. In one configuration, the method 200 may be performed by a Tx leakage signal reduction module 118 on a transceiver chip 110 in the wireless communication device 104. The wireless communication device 104 may receive 202 a receive signal. The receive signal may be received by the primary antenna 106. The receive signal may include the desired receive signal and a Tx leakage signal.

The wireless communication device 104 may process 204 the receive signal in a receiver. In one configuration, the wireless communication device 104 may process 204 the receive signal in a primary receiver (PRx) 114 or a diversity receiver (DRx) 116. The wireless communication device 104 may provide 206 a feedback signal from the receiver to a feedback downconverter in a feedback receiver. In one configuration, the feedback signal may be output from a cascode stage in the receiver. The wireless communication device 104 may then downconvert 208 the frequency of the feedback signal using the feedback downconverter in the feedback receiver. The wireless communication device 104 may filter 210 the feedback signal in the feedback receiver. The wireless communication device 104 may then convert 212 the feedback signal to a digital leakage reduction signal using an analog-to-digital converter (ADC) and a digital signal processor (DSP). In one configuration, the digital signal processor (DSP) may be located on a modem.

The wireless communication device 104 may apply 214 the digital leakage reduction signal to a Tx leakage signal reduction module 118 to minimize the Tx leakage signal in the receive signal. For example, the digital leakage reduction signal may be used to adjust the values of a notch filter. The notch filter may be part of the receiver. Alternatively, the notch filter may be located off the transceiver chip 110 on the wireless communication device 104. The notch filter may filter out the Tx leakage signal prior to the cascode stage. Thus, the configuration of the notch filter may be adjusted using feedback to minimize the Tx leakage signal in the receive signal. As another example, the digital leakage reduction signal may be used to adjust a tunable impedance in a hybrid transformer on the wireless communication device 104. Adjusting a tunable impedance in a hybrid transformer is discussed in additional detail below in relation to FIG. 6. Adjusting the tunable impedance may reduce the Tx leakage signal in the wireless signal.

Figure 3:
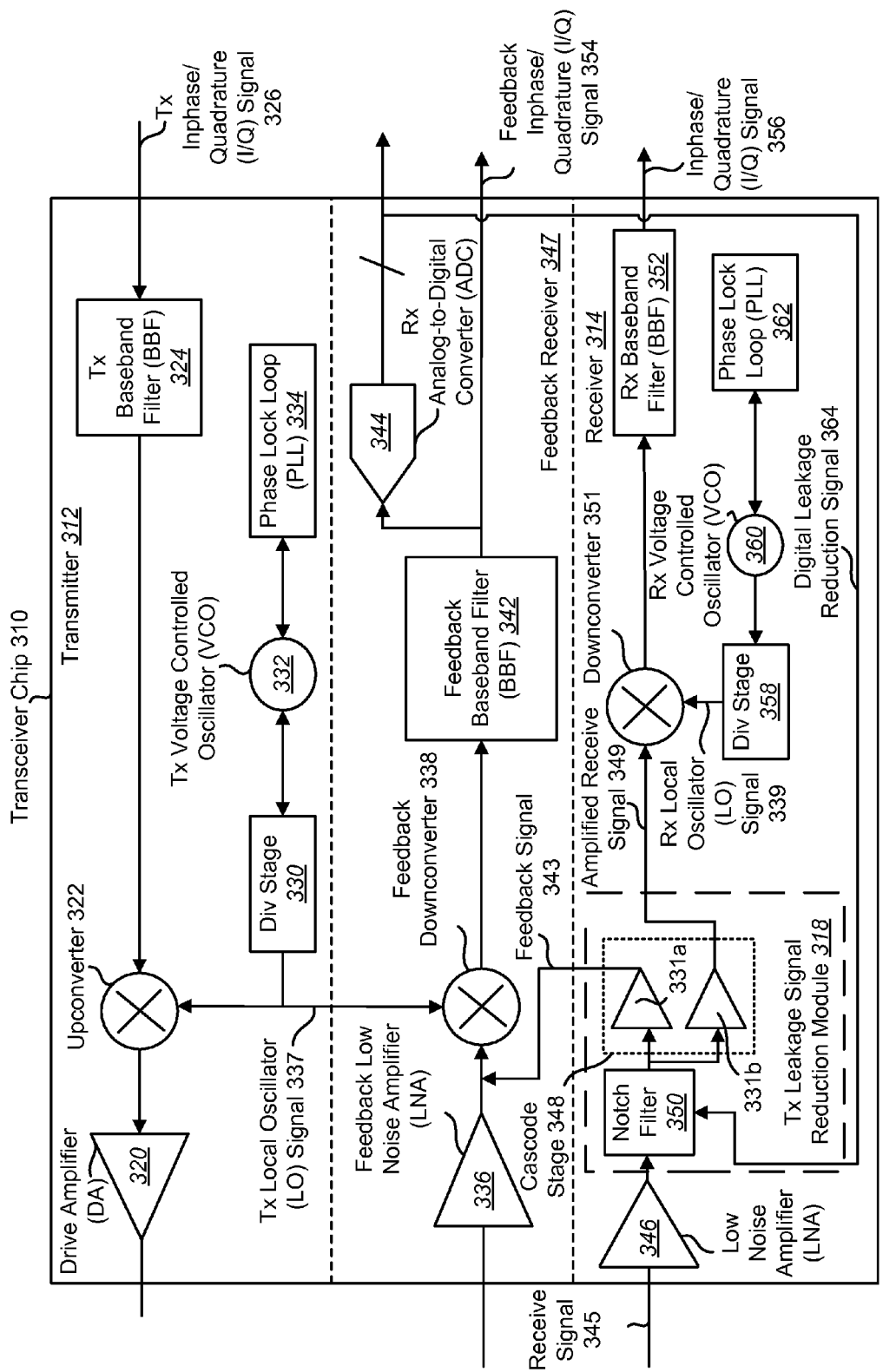
FIG. 3 is a block diagram illustrating a transceiver chip that includes a Tx leakage signal reduction module.

FIG. 3 is a block diagram illustrating a transceiver chip 310 that includes a Tx leakage signal reduction module 318. The transceiver chip 310 of FIG. 3 may be one configuration of the transceiver chip 110 of FIG. 1. The transceiver chip 310 may include a transmitter 312, a feedback receiver 347 and a receiver 314. The receiver 314 may be a primary receiver (PRx) or a diversity receiver (DRx). In one configuration, the feedback receiver 347 may be part of the transmitter 312.

The transmitter 312 may receive a Tx inphase/quadrature (I/Q) signal 326. The Tx inphase/quadrature (I/Q) signal 326 may be passed through a Tx baseband filter (BBF) 324 before being upconverted to a transmit frequency by an upconverter 322. The upconverted transmit signal may then be amplified by a drive amplifier (DA) 320 before being transmitted. The transmitter 312 may include a phase lock loop (PLL) 334, a Tx voltage controlled oscillator (VCO) 332 and a Div stage 330 that are used to generate a Tx local oscillator (LO) signal 337. The Tx local oscillator (LO) signal 337 may be provided to the upconverter 322.

The feedback receiver 347 may be used to regulate the transmitter 312 (e.g., to provide periodic feedback about the power levels of the transmitter 312 to ensure that the transmitter 312 is transmitting with the proper amount of power). During regular operation, the feedback receiver 347 may be off for considerable amounts of time (to save power). In other words, the feedback receiver 347 may normally be turned on for short amounts of time to track the power of the transmitter 312 and then turned off. Thus, the circuitry in the feedback receiver 347 may be reused to tune a notch filter 350. For example, the feedback baseband filter (BBF) 342 and the Rx analog-to-digital converter (ADC) 344 may be reused to tune the notch filter 350.

The circuitry in the feedback receiver 347 may include a feedback low noise amplifier (LNA) 336 that receives transmit signals. The output of the feedback low noise amplifier (LNA) 336 may be coupled to a feedback downconverter 338 that reuses the synthesizer of the transmitter 312. Thus, the feedback downconverter 338 may receive the Tx local oscillator (LO) signal 337. The output of the feedback downconverter 338 may be coupled to a feedback baseband filter (BBF) 342. The feedback baseband filter (BBF) 342 may output the feedback inphase/quadrature (I/Q) signal 354 to the modem. The output of the feedback baseband filter (BBF) 342 may also be passed through an analog-to-digital converter (ADC) 344 before being provided to the modem (although only one analog-to-digital converter (ADC) 344 is shown, two analog-to-digital converters (ADCs) 344 may be used, one for the inphase signal and one for the quadrature signal).

To reuse the feedback receiver 347, the receiver 314 may provide a feedback signal 343 to the feedback downconverter 338. The feedback signal 343 may be current that is bled from a cascode stage 348 in a Tx leakage signal reduction module 318. For example, the cascode stage 348 may include a first amplifier 331a and a second amplifier 331b. The output of the first amplifier 331a may be provided to the feedback downconverter 338 as the feedback signal 343. The feedback signal 343 may be either a voltage signal or a current signal. In one configuration, the feedback signal 343 may be current bled from a cascode stage 348. The output of the second amplifier 331b may be provided to a downconverter 351 on the receiver 314 as the amplified receive signal 349. The feedback signal 343 may provide feedback about a notch filter 350 in the Tx leakage signal reduction module 318, allowing the notch filter 350 to be tuned. The feedback signal 343 may be processed by the feedback receiver 347 (via the Rx analog-to-digital converter (ADC) 344) to obtain a digital leakage reduction signal 364. Additional digital signal processing (e.g., by the modem) may be performed on the output of the Rx analog-to-digital converter (ADC) 344 (such as by a digital signal processor (DSP)) to obtain the digital leakage reduction signal 364. The digital leakage reduction signal 364 may be used to tune the Tx leakage signal reduction module 318 in the receiver 314.

The receiver 314 may include a low noise amplifier (LNA) 346. The low noise amplifier (LNA) 346 may receive a receive signal 345. The receive signal 345 may include undesirable Tx leakage. To reduce the Tx leakage in the receive signal 345, the primary 314 may include a Tx leakage reduction module 318. The Tx leakage signal reduction module 318 may include the cascode stage 348 and the notch filter 350. The notch filter 350 may be coupled to the output of the low noise amplifier (LNA) 346. The notch filter 350 may also receive the digital leakage reduction signal 364. The digital leakage reduction signal 364 may provide accurate notch filter 350 tuning across process, voltage and temperature (PVT) to minimize the Tx leakage in the receive signal 345. The Tx leakage signal reduction module 318 may use existing hardware (such as the feedback receiver 347) to reduce the Tx leakage signal (by tuning the notch filter 350 to remove the Tx leakage signal).

The output of the low noise amplifier (LNA) 346 may be coupled to the notch filter 350. The output of the notch filter 350 may be coupled to the cascode stage 348. As discussed above, the cascode stage 348 may include a first amplifier 331a and a second amplifier 331b. The output of the second amplifier may be provided to a downconverter 351 on the receiver 314. In one configuration, 10% of the current is bled as the feedback signal 343.

The receiver 314 may include a phase lock loop (PLL) 362, an Rx voltage controlled oscillator (VCO) 360 and a Div stage 358 that provide an Rx local oscillator (LO) signal 339 to the downconverter 351. The downconverter 351 may convert signals to baseband frequency. The output of the downconverter 351 may be coupled to an Rx baseband filter (BBF) 352. The Rx baseband filter (BBF) 352 may then output the inphase/quadrature (I/Q) signal 356. Using the feedback receiver 347 to tune the notch filter 350 may provide reliable rejection of the Tx leakage signal across process, voltage and temperature (PVT).

Figure 4:
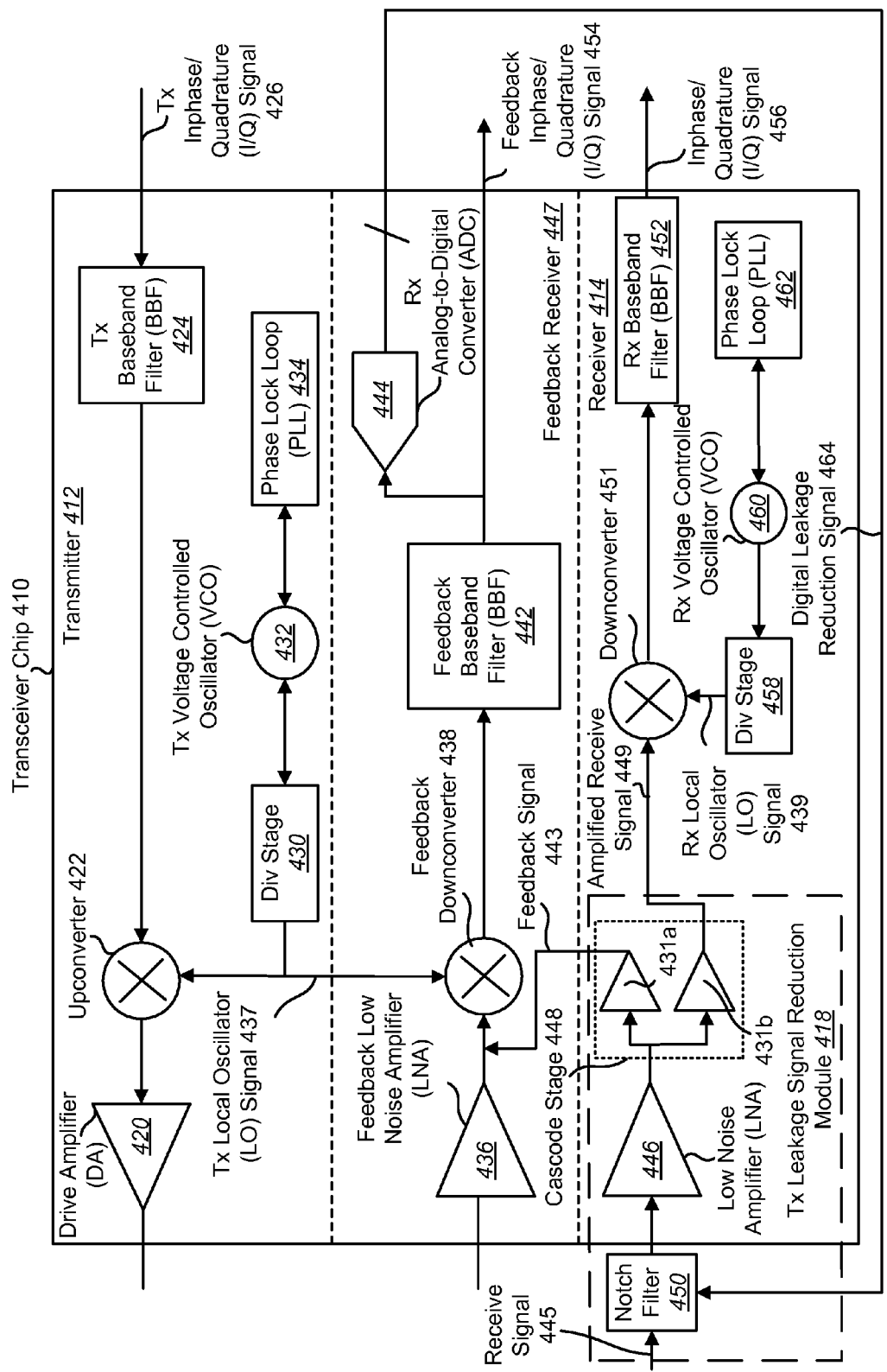
FIG. 4 is a block diagram illustrating another transceiver chip that includes a Tx leakage signal reduction module.

FIG. 4 is a block diagram illustrating another transceiver chip 410 that includes a Tx leakage signal reduction module 418. The Tx leakage signal reduction module 418 may include a notch filter 450 that is located off the transceiver chip 410. The transceiver chip 410 of FIG. 4 may be one configuration of the transceiver chip 110 of FIG. 1. The transceiver chip 410 may include a transmitter 412, a feedback receiver 447 and a receiver 414. In one configuration, the feedback receiver 447 may be part of the transmitter 412. The receiver 414 may be a primary receiver (PRx) or a diversity receiver (DRx).

The transmitter 412 may receive a Tx inphase/quadrature (I/Q) signal 426. The Tx inphase/quadrature (I/Q) signal 426 may be passed through a Tx baseband filter (BBF) 424 before being upconverted to a transmit frequency by an upconverter 422. The transmit signal may then be amplified by a drive amplifier (DA) 420 before being transmitted. The transmitter 412 may include a phase lock loop (PLL) 434, a Tx voltage controlled oscillator (VCO) 432 and a Div stage 430 that are used to generate a Tx local oscillator (LO) signal 437. The Tx local oscillator (LO) signal 437 may be provided to the upconverter 422.

The feedback receiver 447 may be used to regulate the transmitter 412 (e.g., to provide periodic feedback about the power levels of the transmitter 412 to ensure that the transmitter 412 is transmitting with the proper amount of power). During regular operation, the feedback receiver 447 may be off for considerable amounts of time (to save power). In other words, the feedback receiver 447 may normally be turned on for short amounts of time to track the power of the transmitter 412 and then turned off. Thus, the circuitry in the feedback receiver 447 may be reused to tune a notch filter 450. Tuning using the feedback receiver 447 may be performed only one time or performed periodically, when the feedback receiver 447 is idle.

The circuitry in the feedback receiver 447 may include a feedback low noise amplifier (LNA) 436 that receives transmit signals. The output of the feedback low noise amplifier (LNA) 436 may be coupled to a feedback downconverter 438 that reuses the synthesizer of the transmitter 412. Thus, the feedback downconverter 438 may receive the Tx local oscillator (LO) signal 437. The output of the feedback downconverter 438 may be coupled to a feedback baseband filter (BBF) 442. The feedback baseband filter (BBF) 442 may output the feedback inphase/quadrature (I/Q) signal 454 to the modem. The output of the feedback baseband filter (BBF) 442 may also be passed through an analog-to-digital converter (ADC) 444 before being provided to the modem.

To reuse the feedback receiver 447, the receiver 414 may provide a feedback signal 443 to the feedback downconverter 438. The feedback signal 443 may be current that is bled from a cascode stage 448 in a Tx leakage signal reduction module 418. For example, the cascode stage 448 may include a first amplifier 431a and a second amplifier 431b. The output of the first amplifier 431a may be provided to the feedback downconverter 438 as the feedback signal 443. The output of the second amplifier 431b may be provided to a downconverter 451 on the receiver 414 as the amplified receive signal 449. The feedback signal 438 may provide feedback about a notch filter 450 in the Tx leakage signal reduction module 418, allowing the notch filter 450 to be tuned. The feedback signal 443 may be processed by the feedback receiver 447 (via the Rx analog-to-digital converter (ADC) 444) to obtain a digital leakage reduction signal 464. Additional digital processing (e.g., by the modem) may be performed on the output of the Rx analog-to-digital converter (ADC) 444 to obtain the digital leakage reduction signal 464. The digital leakage reduction signal 464 may be used to tune the Tx leakage signal reduction module 418 in the receiver 414.

The Tx leakage signal reduction module 418 may include a notch filter 450. In one configuration, the notch filter 450 may not be located on the transceiver chip 410 (and thus may be located off-chip). The notch filter 450 may receive a receive signal 445. The notch filter 450 may also receive the digital leakage reduction signal 464 (which tunes the notch filter 450). The output of the notch filter 450 may be provided to the cascode stage 448. As discussed above, the cascode stage 448 may include a first amplifier 431a and a second amplifier 431b. The output of the first amplifier 431a may be the feedback signal 443 provided to the feedback receiver 447. The output of the second amplifier 431b may be the amplified receive signal 349 provided to the downconverter 451. In one configuration, 10% of the current in the cascode stage 448 may be bled as the feedback signal 443.

The digital leakage reduction signal 464 may provide accurate notch filter 450 tuning across process, voltage and temperature (PVT) to minimize the Tx leakage in the receive signal 445. The Tx leakage signal reduction module 418 may use existing hardware (such as the feedback receiver 447) to reduce the Tx leakage signal (by tuning the notch filter 450 to remove the Tx leakage signal).

The receiver 414 may include a phase lock loop (PLL) 462, an Rx voltage controlled oscillator (VCO) 460 and a Div stage 458 that provide an Rx local oscillator (LO) signal 439 to the downconverter 451. The downconverter 451 may convert signals to baseband frequency. The output of the downconverter 451 may be coupled to an Rx baseband filter (BBF) 452. The Rx baseband filter (BBF) 452 may then output the inphase/quadrature (I/Q) signal 456. Using the feedback receiver 447 to tune the notch filter 450 may provide reliable rejection of the Tx leakage signal across process, voltage and temperature (PVT).

Figure 5:
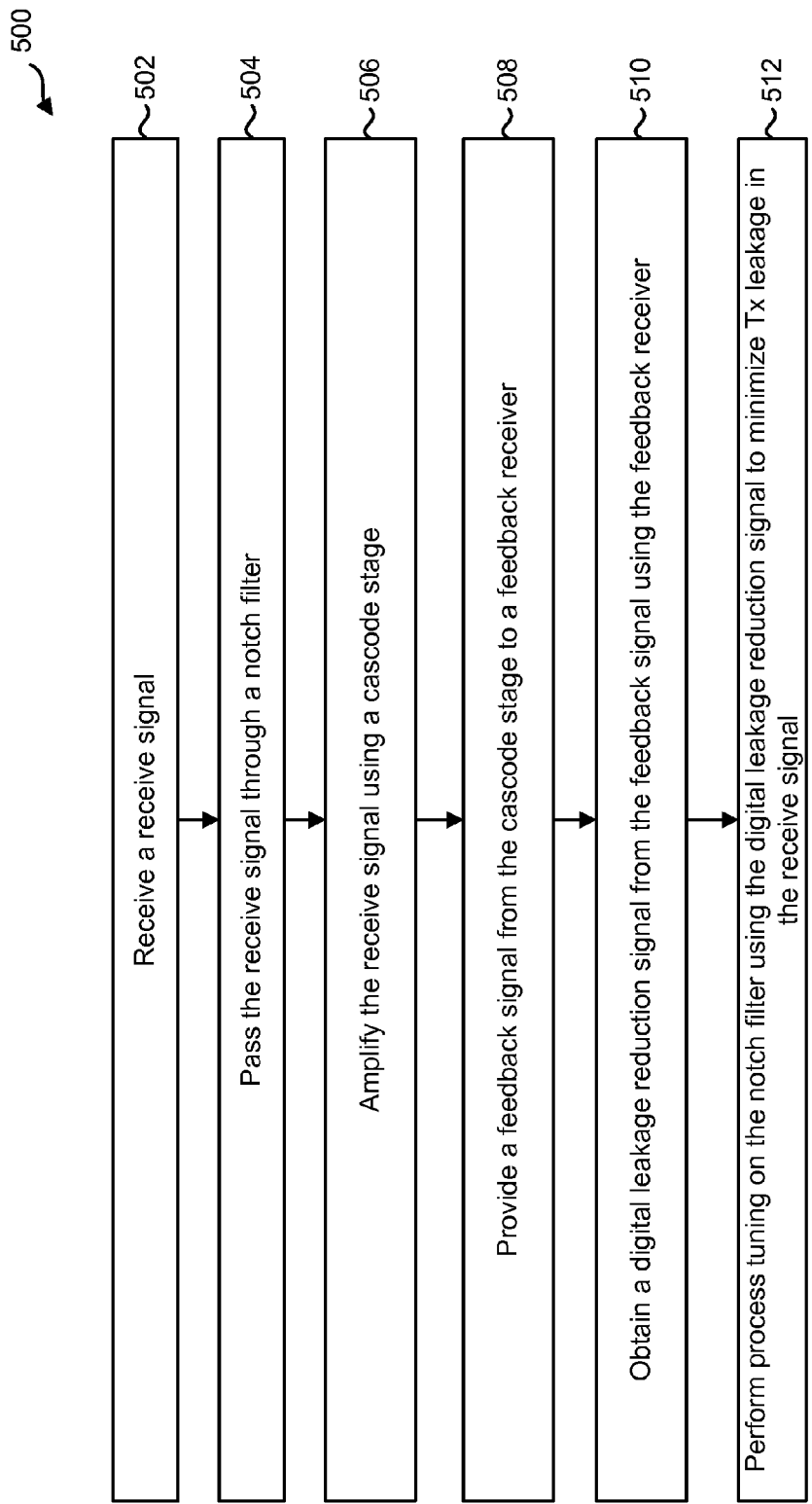
FIG. 5 is a flow diagram of another method for minimizing a Tx leakage signal in a primary receive signal.

FIG. 5 is a flow diagram of another method 500 for minimizing a Tx leakage signal in a receive signal 345. The method 500 may be performed by a wireless communication device 104. In one configuration, the method 500 may be performed by a Tx leakage signal reduction module 318 on a transceiver chip 310 in the wireless communication device 104. The wireless communication device 104 may receive 502 a receive signal 345. The receive signal 345 may be received by an antenna 106, 108. The receive signal 345 may include undesirable Tx leakage.

The wireless communication device 104 may pass 504 the receive signal 345 through a notch filter 350. The wireless communication device 104 may amplify 506 the receive signal using a cascode stage 348. The wireless communication device 104 may provide 508 a feedback signal 343 from the cascode stage 348 to a feedback receiver 347. The wireless communication device 104 may obtain 510 a digital leakage reduction signal 364 from the feedback signal 343 using the feedback receiver 347. For example, the feedback signal 343 may be downconverted by a feedback downconverter 338, filtered by a feedback baseband filter (BBF) 342 and converted to a digital signal by an Rx analog-to-digital converter (ADC) 344 in the feedback receiver 347.

The wireless communication device 104 may perform 512 process tuning on the notch filter 350 using the digital leakage reduction signal 364 to minimize Tx leakage in the receive signal 345. For example, the digital leakage reduction signal 364 may be used to adjust the values of the notch filter 350 (and thus adjust the frequencies filtered by the notch filter 350).

Figure 6:
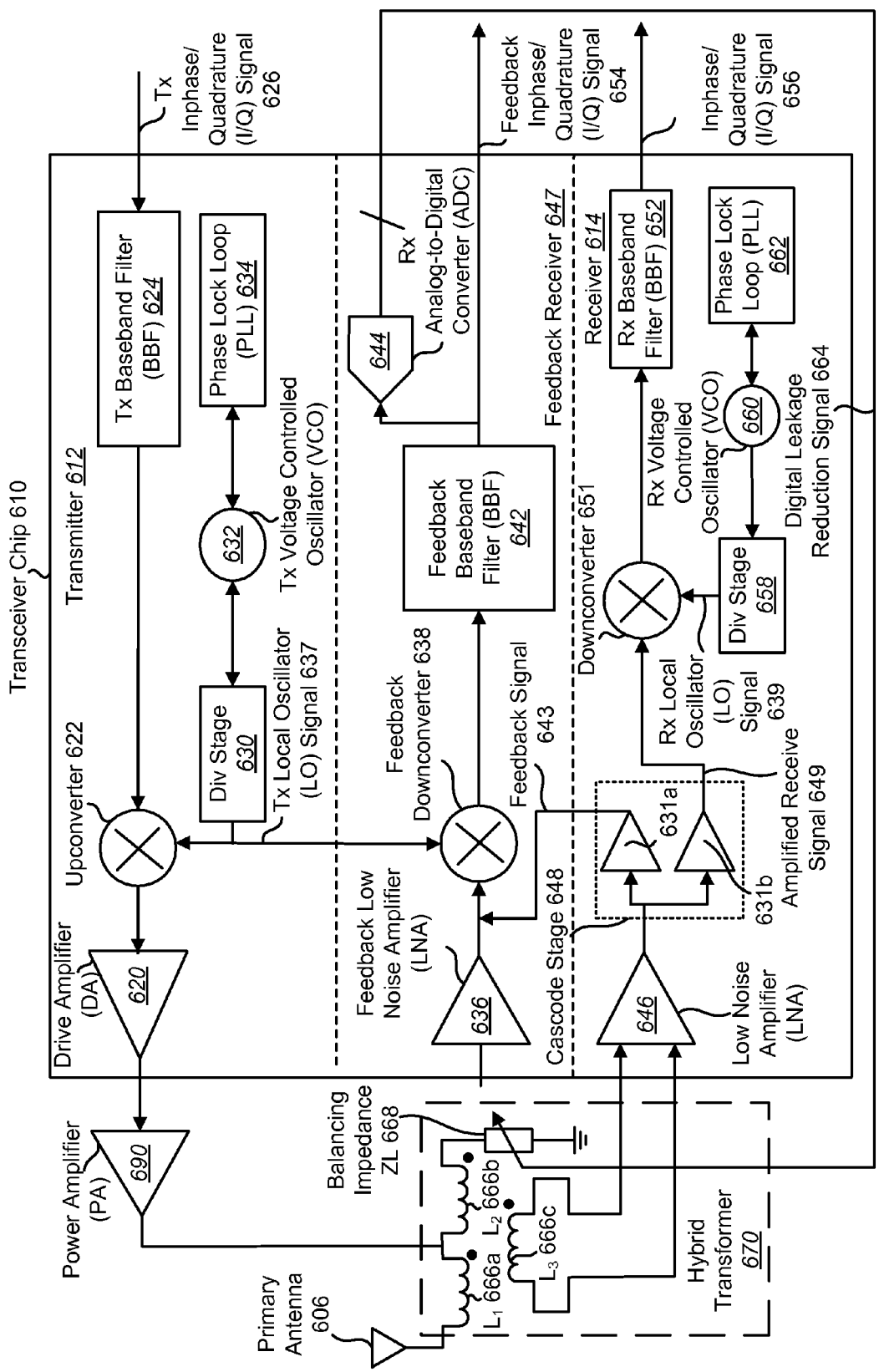
FIG. 6 is a block diagram illustrating Tx leakage signal reduction using an integrated duplexer.

FIG. 6 is a block diagram illustrating Tx leakage signal reduction using an integrated duplexer. The integrated duplexer may be implemented using a hybrid transformer 670. The hybrid transformer 670 may include a first inductor L1 666a, a second inductor L2 666b and a third inductor L3 666c. A coupling may occur between the first inductor L1 666a, the second inductor L2 666b and the third inductor L3 666c. The first inductor L1 666a may be coupled between a primary antenna 606 and the second inductor L2 666b. The second inductor L2 666b may be coupled between the first inductor L1 666a and a balancing impedance ZL 668. The balancing impedance ZL 668 may also be coupled to ground. The third inductor L3 666c may be coupled to both a first differential input and a second differential input of a low noise amplifier (LNA) 646 on a transceiver chip 610. The low noise amplifier (LNA) 646 may be part of a receiver 614.

The transceiver chip 610 of FIG. 6 may be one configuration of the transceiver chip 110 of FIG. 1. The transceiver chip 610 may include a transmitter 612, a feedback receiver 647 and the receiver 614. In one configuration, the feedback receiver 647 may be part of the transmitter 612. The receiver 614 may be a primary receiver (PRx) or a diversity receiver (DRx). The transmitter 612 may receive a Tx inphase/quadrature (I/Q) signal 626. The Tx inphase/quadrature (I/Q) signal 626 may be passed through a Tx baseband filter (BBF) 624 before being upconverted to a transmit frequency by an upconverter 622. The transmit signal may then be amplified by a drive amplifier (DA) 620. The output of the drive amplifier (DA) 620 may be coupled to the input of a power amplifier (PA) 690. The power amplifier (PA) 690 may be located off the transceiver chip 610. The output of the power amplifier (PA) 690 may be coupled between the first inductor L1 666a and the second inductor L2 666b. The transmitter 612 may include a phase lock loop (PLL) 634, a Tx voltage controlled oscillator (VCO) 632 and a Div stage 630 that are used to generate a Tx local oscillator (LO) signal 637. The Tx local oscillator (LO) signal 637 may be provided to the upconverter 622.

The feedback receiver 647 may be used to regulate the transmitter 612 (e.g., to provide periodic feedback about the power levels of the transmitter 612 to ensure that the transmitter 612 is transmitting with the proper amount of power). During regular operation, the feedback receiver 647 may be off for considerable amounts of time (to save power). In other words, the feedback receiver 647 may normally be turned on for short amounts of time to track the power of the transmitter 612 and then turned off. Thus, the circuitry in the feedback receiver 647 may be reused to tune the balancing impedance ZL 668. Tuning using the feedback receiver 447 may be performed only one time or performed periodically, when the feedback receiver 447 is idle.

The circuitry in the feedback receiver 647 may include a feedback low noise amplifier (LNA) 636 that receives transmit signals. The output of the feedback low noise amplifier (LNA) 436 may be coupled to a feedback downconverter 438 that reuses the synthesizer of the transmitter 412. Thus, the feedback downconverter 638 may receive the Tx local oscillator (LO) signal 637. The output of the feedback downconverter 638 may be coupled to a feedback baseband filter (BBF) 642. The feedback baseband filter (BBF) 642 may output the feedback inphase/quadrature (I/Q) signal 654 to the modem. The output of the feedback baseband filter (BBF) 642 may also be passed through an analog-to-digital converter (ADC) 644 before being provided to the modem.

To reuse the feedback receiver 647, the receiver 614 may provide a feedback signal 643 to the feedback downconverter 638. The feedback signal 643 may be current that is bled from a cascode stage 648 in the receiver 614. For example, the cascode stage 648 may include a first amplifier 631a and a second amplifier 631b. The output of the first amplifier 631a may be provided to the feedback downconverter 638 as the feedback signal 643. The output of the second amplifier 631b may be provided to a downconverter 651 on the receiver 614 as the amplified receive signal 649. The feedback signal 638 may provide feedback about the balancing impedance ZL 668 in the hybrid transformer 670, allowing the balancing impedance ZL 668 to be tuned. The feedback signal 643 may be processed by the feedback receiver 647 (via the Rx analog-to-digital converter (ADC) 644) to obtain a digital leakage reduction signal 664. Additional digital signal processing (e.g., by the modem) may be performed on the output of the Rx analog-to-digital converter (ADC) 644 to obtain the digital leakage reduction signal 664.

The digital leakage reduction signal 664 may be used to tune the balancing impedance ZL 668 in the hybrid transformer 670. Using the feedback receiver 647 to tune the balancing impedance ZL 668 may provide reliable rejection of the Tx leakage signal across process, voltage and temperature (PVT). The impedance measured by the primary antenna 606 may be too course for application in a hybrid transformer 670. By using the balancing impedance ZL 668, better sensitivity may be obtained. Continuous feedback (via the digital leakage reduction signal 664) may be used to tune the antenna load.

The output of the low noise amplifier (LNA) 646 may be coupled to the input of the cascode stage 648. As discussed above, the cascode stage 648 may include a first amplifier 631a and a second amplifier 631b. The first amplifier 631a may output the feedback signal 643 to the feedback receiver 647. The second amplifier 631b may output the amplified receive signal 649 to a downconverter 651 on the receiver 614. In one configuration, the cascode stage 648 may bleed off 10% of the current to the feedback receiver 647.

The receiver 614 may include a phase lock loop (PLL) 662, an Rx voltage controlled oscillator (VCO) 660 and a Div stage 658 that provide an Rx local oscillator (LO) signal 639 to the downconverter 651. The downconverter 651 may convert signals to baseband frequency. The output of the downconverter 651 may be coupled to an Rx baseband filter (BBF) 652. The Rx baseband filter (BBF) 652 may then output the inphase/quadrature (I/Q) signal 656.

FIG. 7 is a circuit diagram illustrating a notch filter 750. The notch filter 750 of FIG. 7 may be one configuration of the notch filter 350 of FIG. 3 or the notch filter 450 of FIG. 4. The notch filter 750 may have an input and an output. The notch filter 750 may include a first variable capacitor C1 770a and a second variable capacitor C2 770b. The variable capacitors 770 may be capacitors that capacitances that are able to be changed using either electronic or mechanical means. The variable capacitors 770 may be implemented using on-chip capacitors and switches. The first variable capacitor C1 770a may be coupled between the second variable capacitor C2 770b and ground. The second variable capacitor C2 770b may be coupled to the input of the notch filter 750.

The notch filter 750 may also include a resistor R1 774 and an inductor L1 772. The resistor R1 774 may be coupled between the inductor L1 772 and ground. The inductor L1 772 may be coupled between the resistor R1 774 and the second variable capacitor C2 770b. The notch filter 750 may also include a resistor Rneg 776. The resistor Rneg 776 may be coupled between ground and the second variable capacitor C2 770b. The resistor Rneg 776 is the equivalent negative resistor of a circuit (such as a negative-gm circuit) that is used to improve the equivalent Quality factor (Q) of the inductor L1 772. The Quality factor (Q) of the notch filter 750 may be found using Equation (1):

$$Q = \left(\frac{\omega_0 L_1}{R_1}\right). \qquad (1)$$

In Equation (1), $\omega_0$ is the notch frequency of the notch filter 750. The effective paddle inductance Lp from the bottom of the capacitor C2 770b to ground may be found using Equation (2):

$$L_p = L_1 \cdot \left(\frac{Q^2 + 1}{Q^2}\right). \qquad (2)$$

The passband frequency $f_p$ of the notch filter 750 may be found using Equation (3):

$$f_p = \frac{1}{2\pi\sqrt{L_p \cdot C_1}}. \qquad (3)$$

The notch frequency $f_n$ of the notch filter 750 may be found using Equation (4):

$$f_n = \frac{1}{2\pi\sqrt{L_p \cdot (C_1 + C_2)}}. \qquad (4)$$

The value for the first variable capacitor C1 770a may be found using Equation (5):

$$C_1 = \frac{1}{(2\pi \cdot f_p)^2 \cdot L_p}. \qquad (5)$$

Likewise, the value for the second variable capacitor C2 770b may be found using Equation (6):

$$C_2 = C_1 \cdot \left[\left(\frac{f_p}{f_n}\right)^2 - 1\right]. \qquad (6)$$

The equivalent resistance Rp from the capacitor C2 770b to ground may be found using Equation (7):

$$R_p = R_1 \cdot (Q^2 + 1) \| R_{neg}. \qquad (7)$$

The equivalent resistance Req may be found using Equation (8):

$$R_{eq} \approx R_p \cdot \left(1 + \frac{C_1}{C_2}\right)^2. \qquad (8)$$

Figure 8:
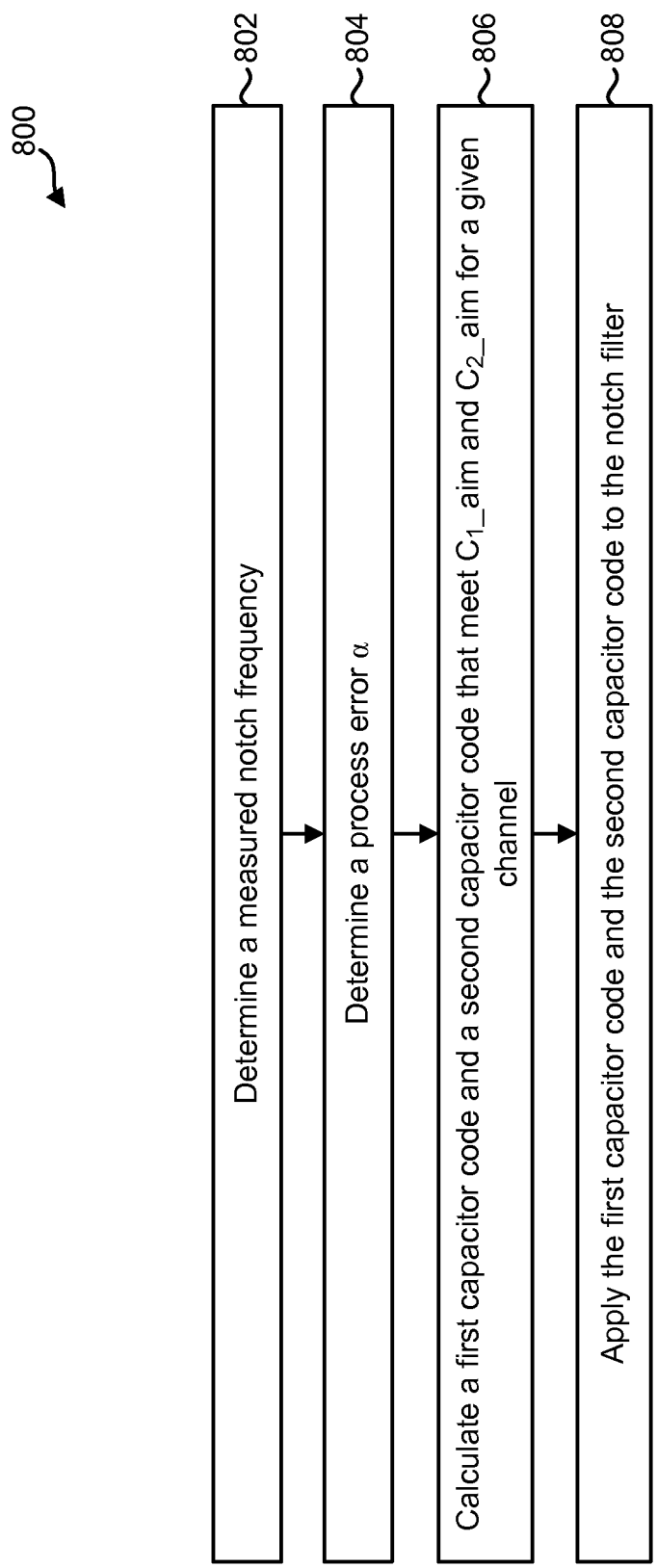
FIG. 8 is a flow diagram of a method for process tuning a notch filter.

FIG. 8 is a flow diagram of a method 800 for process tuning a notch filter 750. The method 800 may be performed by a wireless communication device 104. The wireless communication device 104 may determine 802 a measured notch frequency. Determining the measured notch frequency is discussed in additional detail below in relation to FIG. 9. The measured notch frequency may be found using Equation (9):

$$F_{n,meas} = \frac{1}{2\pi\sqrt{L_p \cdot (1+\alpha)(C_1 + C_2)}}. \quad (9)$$

In Equation (9), α is the process error that occurs from the notch frequency shifting due to process error. The wireless communication device 104 may determine 804 the process error α. The process error α may be determined using Equation (10:

$$\alpha = \left[\left(\frac{f_n}{f_{n,meas}}\right)^2 - 1\right]. \quad (10)$$

The wireless communication device 104 may calculate 806 a first capacitor code (i.e., a code that adjusts the value of the first variable capacitor C1 770a) and a second capacitor code (i.e., a code that adjusts the value of the second variable capacitor C2 770b) that meets the $C_{1\_aim}$ and $C_{2\_aim}$ for a given channel. The wireless communication device 104 may then apply 808 the first capacitor code and the second capacitor code to the notch filter 750.

Figure 9:
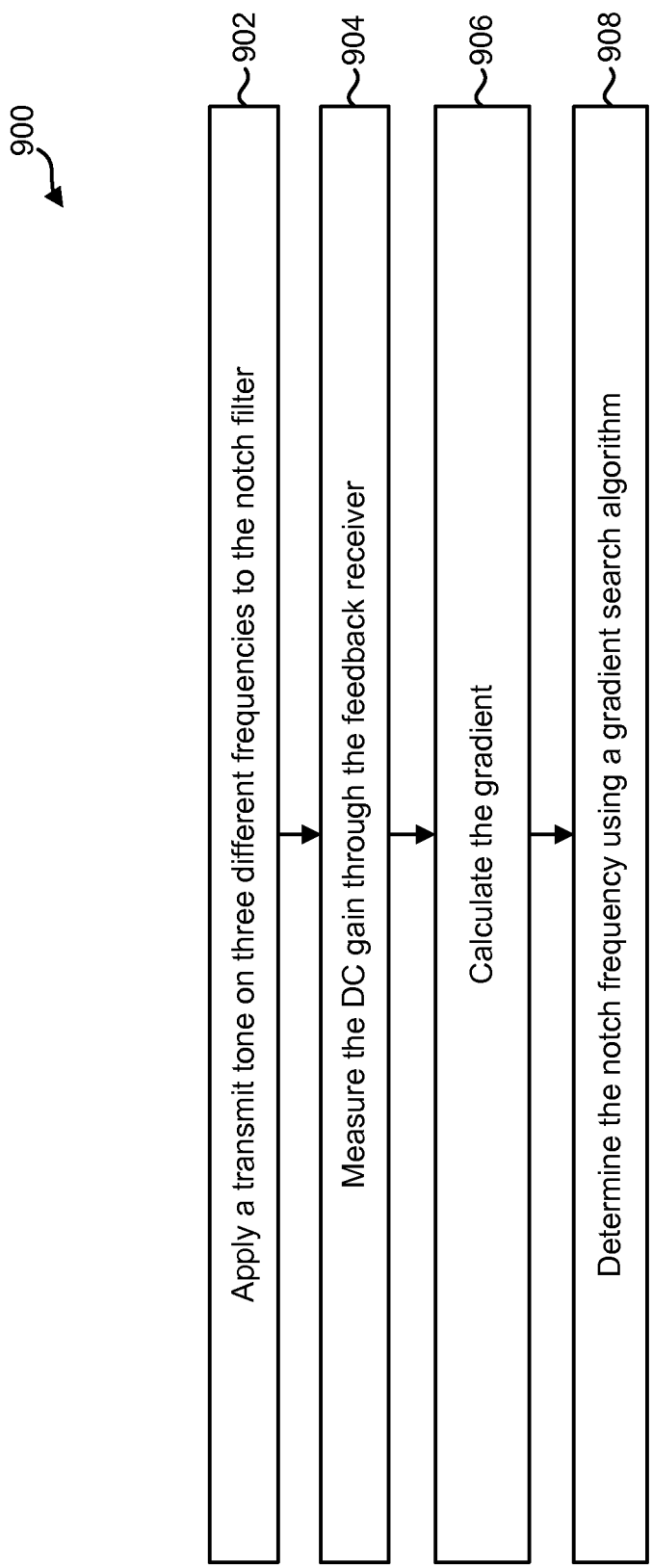
FIG. 9 is a flow diagram of a method for finding the measured notch frequency of a notch filter.

FIG. 9 is a flow diagram of a method 900 for finding the measured notch frequency of a notch filter 750. The method 900 may be performed by a wireless communication device 104. Notch tuning may be performed with any search-efficient algorithm, such as a gradient search algorithm. The wireless communication device 104 may apply 902 a transmit tone on three different frequencies to the notch filter 750. The wireless communication device 104 may then measure 904 the DC gain through the feedback receiver 347. The wireless communication device 104 may calculate 906 the gradient. The wireless communication device 104 may determine 908 a notch frequency using a gradient search algorithm. The notch frequency found using the gradient search algorithm may have better results than a linear search. The steps in the method 900 may need to be repeated to precisely locate the notch frequency and fine tune the notch filter 750.

Figure 10:
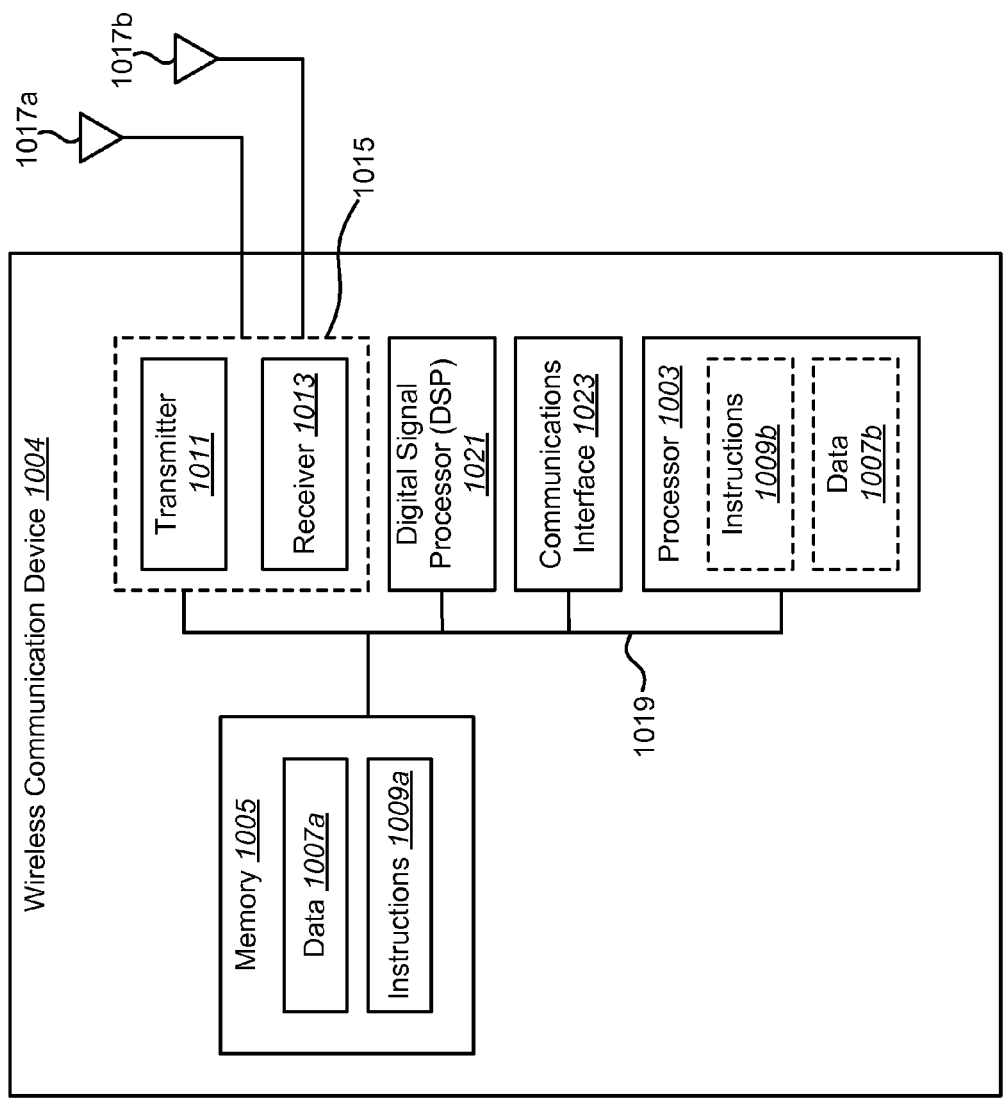
FIG. 10 illustrates certain components that may be included within a wireless communication device.

FIG. 10 illustrates certain components that may be included within a wireless communication device 1004. The wireless communication device 1004 may be an access terminal, a mobile station, a user equipment (UE), etc. The wireless communication device 1004 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1004 of FIG. 10, in an alternative configuration, a combination of processors (e.g., an ARM and DSP) could be used.

The wireless communication device 1004 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009, various portions of the instructions 1009b may be loaded onto the processor 1003, and various pieces of data 1007b may be loaded onto the processor 1003.

The wireless communication device 1004 may also include a transmitter 1011 and a receiver 1013 to allow transmission and reception of signals to and from the wireless communication device 1004 via a first antenna 1017a and a second antenna 1017b. The transmitter 1011 and receiver 1013 may be collectively referred to as a transceiver 1015. The wireless communication device 1004 may also include (not shown) multiple transmitters, additional antennas, multiple receivers and/or multiple transceivers.

The wireless communication device 1004 may include a digital signal processor (DSP) 1021. The wireless communication device 1004 may also include a communications interface 1023. The communications interface 1023 may allow a user to interact with the wireless communication device 1004.

The various components of the wireless communication device 1004 may be coupled together by one or more buses, which may include a power bus, a control signal bus, a status signal bus, a data bus, etc. For the sake of clarity, the various buses are illustrated in FIG. 10 as a bus system 1019.

Figure 11:
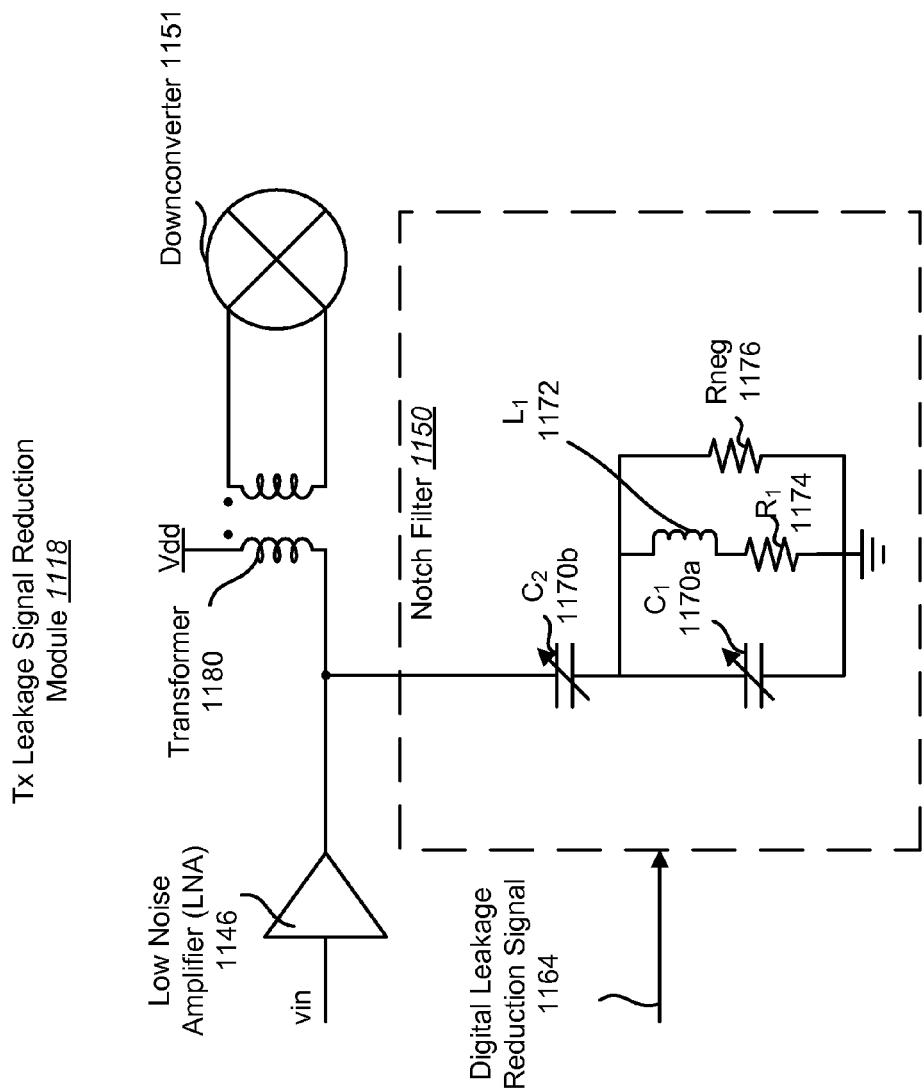
FIG. 11 is a circuit diagram illustrating a Tx leakage signal reduction module.

FIG. 11 is a circuit diagram illustrating a Tx leakage signal reduction module 1118. The Tx leakage signal reduction module 1118 may include a notch filter 1150, a low noise amplifier (LNA) 1146, a transformer 1180 and a downconverter 1151. In this configuration, the notch filter 1150 may be at the output of the low noise amplifier (LNA) 1146.

The notch filter 1150 may include a first variable capacitor C1 1170a and a second variable capacitor C2 1170b. The first variable capacitor C1 1170a may be coupled between the second variable capacitor C2 1170b and ground. The second variable capacitor C2 1170b may be coupled to the input of the notch filter 1150 (i.e., to the output of the low noise amplifier (LNA) 1146).

The notch filter 1150 may also include a resistor R1 1174 and an inductor L1 1172. The resistor R1 1174 may be coupled between the inductor L1 1172 and ground. The inductor L1 1172 may be coupled between the resistor R1 1174 and the second variable capacitor C2 1170b. The notch filter 1150 may also include a resistor Rneg 1176. The resistor Rneg 1176 may be coupled between ground and the second variable capacitor C2 1170b. The resistor Rneg 1176 is the equivalent negative resistor of a circuit (such as a negative-gm circuit) that is used to improve the equivalent Quality factor (Q) of the inductor L1 1172. The notch filter 1150 may be tuned by a digital leakage reduction signal 1164. The digital leakage reduction signal 1164 may be received from an analog-to-digital converter (ADC) 344. The digital leakage reduction signal 1164 may adjust the capacitances of the first variable capacitor C1 1170a and the second variable capacitor C2 1170b.

The low noise amplifier (LNA) 1146 may receive an input signal vin. The output of the low noise amplifier (LNA) 1146 may be coupled to a transformer 1180. One of the coils of the transformer 1180 may be coupled to a supply voltage Vdd. The other coil of the transformer 1180 may be coupled to each input of a downconverter 1151.

Figure 12:
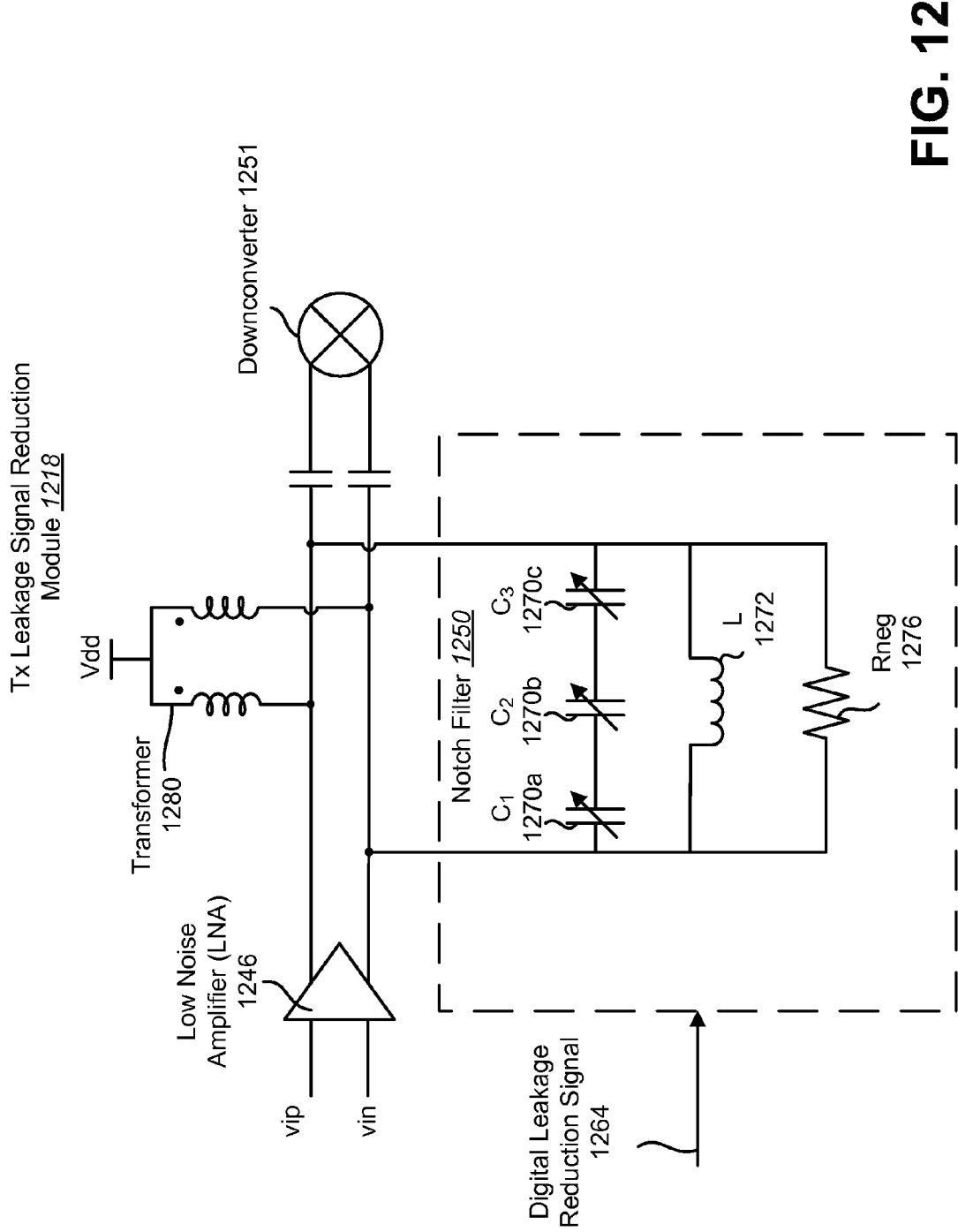
FIG. 12 is a circuit diagram illustrating another Tx leakage signal reduction module.

FIG. 12 is a circuit diagram illustrating another Tx leakage signal reduction module 1218. The Tx leakage signal reduction module 1218 may include a notch filter 1250, a low noise amplifier (LNA) 1246, a transformer 1280 and a downconverter 1251. In this configuration, the notch filter 1250 may be at the output of the differential low noise amplifier (LNA) 1246.

The notch filter 1250 may include a first variable capacitor C1 1270*a*, a second variable capacitor C2 1270*b*, a third variable capacitor C3 1270*c*, an inductor 1272 and a resistor Rneg 1276. The first variable capacitor C1 1270*a* may be coupled between the second variable capacitor C2 1270*b* and the first differential output of the low noise amplifier (LNA) 1246 (e.g., the output corresponding to the input signal vin). The second variable capacitor C2 1170*b* may be coupled between the first variable capacitor C1 1270*a* and the third variable capacitor 1270*c*. The third variable capacitor C3 1270*c* may be coupled between the second variable capacitor C2 1270*b* and the second differential output of the low noise amplifier (LNA) 1246 (e.g., the output corresponding to the input signal vip). The inductor L 1272 may be coupled between the first output and the second output of the low noise amplifier (LNA) 1246. The resistor Rneg may also be coupled between the first output of the low noise amplifier (LNA) 1246 and the second input of the low noise amplifier (LNA) 1246.

The notch filter 1150 may be tuned by a digital leakage reduction signal 1264. The digital leakage reduction signal 1264 may be received from an analog-to-digital converter (ADC) 344. The digital leakage reduction signal 1264 may adjust the capacitances of the first variable capacitor C1 1270*a*, the second variable capacitor C2 1270*b* and the third variable capacitor C3 1270*c*.

The low noise amplifier (LNA) 1146 may receive a first differential input signal vin and a second differential input signal vip. The output of the low noise amplifier (LNA) 1146 may be coupled to a transformer 1180. A first coil in the transformer 1280 may be coupled between a supply voltage Vdd and the first output of the low noise amplifier (LNA) 1246. A second coil in the transformer 1280 may be coupled between the supply voltage Vdd and the second output of the low noise amplifier (LNA) 1246. A capacitor may be coupled between the first output of the low noise amplifier (LNA) 1246 and a downconverter 1251. A capacitor may also be coupled between the second output of the low noise amplifier (LNA) 1246 and the downconverter 1251.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2, 5, 8 and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A wireless communication device configured for reducing transmit leakage in a received signal, comprising:
a transceiver chip, comprising:
a receiver configured to receive the received signal;
a transmitter comprising a local oscillator;
a feedback receiver coupled between the transmitter and the receiver, the feedback receiver comprising a feedback low-noise amplifier coupled to a feedback downconverter, the feedback downconverter coupled to a feedback baseband filter, and the feedback baseband filter coupled to a receive analog-to-digital converter, wherein the feedback receiver provides periodic feedback about power levels of the transmitter; and
a transmit leakage signal reduction module comprising a notch filter coupled to a first amplifier, wherein the first amplifier provides a feedback signal to the feedback downconverter, wherein the transmit leakage signal reduction module reuses the feedback receiver to tune circuitry to reduce transmit leakage in the received signal, and wherein the notch filter receives the reduced transmit leakage outputted from the receive analog-to-digital converter when the feedback receiver is not providing feedback about power levels of the transmitter.

2. The wireless communication device of claim 1, wherein notch filter reduces transmit leakage in the received signal.

3. The wireless communication device of claim 2, wherein the notch filter is located on the transceiver chip, and wherein the notch filter is coupled to an output of a low noise amplifier that receives the received signal.

4. The wireless communication device of claim 2, wherein the notch filter is located off the transceiver chip, wherein the notch filter receives the received signal, and wherein an output of the notch filter is coupled to an input of a low noise amplifier on the transceiver chip.

5. The wireless communication device of claim 1, wherein the receiver provides a feedback signal to the feedback receiver, and wherein the feedback receiver provides a digital leakage reduction signal to the transmit leakage signal reduction module.

6. The wireless communication device of claim 5, wherein the digital leakage reduction signal tunes the notch filter to minimize transmit leakage in the received signal.

7. The wireless communication device of claim 6, wherein the notch filter comprises a first variable capacitor, a second variable capacitor, a first resistor, a second resistor and an inductor.

8. The wireless communication device of claim 6, wherein the notch filter is tuned to provide reliable rejection of transmit leakage across process, voltage and temperature.

9. The wireless communication device of claim 5, wherein the digital leakage reduction signal tunes a balancing impedance in a hybrid transformer on the wireless communication device.

10. The wireless communication device of claim 9, wherein the hybrid transformer comprises a first inductor, a second inductor and a third inductor, and wherein the balancing impedance is coupled between the second inductor and ground.

11. The wireless communication device of claim 5, wherein an output of the receive analog-to-digital converter is converted to the digital leakage reduction signal by a digital signal processor.

12. The wireless communication device of claim 1, wherein the feedback downconverter in the feedback receiver receives a signal from the local oscillator.

13. A method, performed by a transceiver chip comprised in a wireless communication device, for reducing transmit leakage in a received signal, comprising:
receiving, by a receiver, the received signal;
providing, by a feedback receiver coupled between a transmitter and the receiver, the feedback receiver comprising a feedback low-noise amplifier coupled to a feedback downconverter, the feedback downconverter coupled to a feedback baseband filter, the feedback baseband filter coupled to a receive analog-to-digital converter, periodic feedback about power levels of the transmitter;
providing, by a first amplifier included in a transmit leakage signal reduction module, a feedback signal to the feedback downconverter;
reusing, by the transmit leakage signal reduction module, the feedback receiver to tune circuitry to reduce transmit leakage in the received signal; and
receiving, by a notch filter coupled to the first amplifier, the reduced transmit leakage outputted from the receive analog-to-digital converter when the feedback receiver is not providing feedback about power levels of the transmitter.

14. The method of claim 13, further comprising:
downconverting the feedback signal using the feedback downconverter; and
filtering the downconverted feedback signal using the feedback baseband filter.

15. The method of claim 13, further comprising passing the receive signal through the notch filter.

16. The method of claim 13, further comprising performing process tuning on the notch filter using a digital leakage reduction signal.

17. The method of claim 16, wherein the notch filter is located on the transceiver chip, and wherein the notch filter is coupled to an output of a low noise amplifier that receives the received signal.

18. The method of claim 16, wherein the notch filter is located off the transceiver chip, wherein the notch filter receives the received signal, and wherein an output of the notch filter is coupled to an input of a low noise amplifier on the transceiver chip.

19. The method of claim 13, wherein the receiver provides the feedback signal to the feedback receiver, and wherein the feedback receiver provides a digital leakage reduction signal to the transmit leakage signal reduction module.

20. The method of claim 19, wherein the digital leakage reduction signal tunes the notch filter to minimize transmit leakage in the received signal.

21. The method of claim 20, wherein the notch filter comprises a first variable capacitor, a second variable capacitor, a first resistor, a second resistor and an inductor.

22. The method of claim 21, further comprising:
determining a measured notch frequency of the notch filter;
determining a process error;
calculating a first capacitor code and a second capacitor code that meet requirements for a channel; and
applying the first capacitor code to the first variable capacitor and the second capacitor code to the second variable capacitor.

23. The method of claim 22, wherein determining a measured notch frequency of the notch filter comprises:
applying a transmit tone on three different frequencies to the notch filter;
measuring a direct current gain through the feedback receiver;
calculating a gradient; and
determining the measured notch frequency using a gradient search algorithm.

24. The method of claim 20, wherein the notch filter is tuned to provide reliable rejection of transmit leakage across process, voltage and temperature.

25. The method of claim 19, wherein the digital leakage reduction signal tunes a balancing impedance in a hybrid transformer on the wireless communication device.

26. The method of claim 25, wherein the hybrid transformer comprises a first inductor, a second inductor and a third inductor, and wherein the balancing impedance is coupled between the second inductor and ground.

27. The method of claim 19, wherein an output of the analog-to-digital converter is provided to a digital signal processor that outputs the digital leakage reduction signal.

28. An apparatus for reducing transmit leakage in a received signal, wherein the apparatus is a wireless communication device comprising a transceiver chip, comprising:
means for receiving the received signal;
means for providing periodic feedback about power levels of a transmitter; the means for providing periodic feedback about power levels of the transmitter coupled between the means for receiving the received signal and the transmitter and comprising a feedback low-noise amplifier coupled to a feedback downconverter, the feedback downconverter coupled to a feedback baseband filter, the feedback baseband filter coupled to a receive analog-to-digital converter;
means for providing a feedback signal to the feedback downconverter; the means for providing the feedback signal to the feedback downconverter comprising a notch filter coupled to a first amplifier;
means for reusing a feedback receiver to tune circuitry to reduce transmit leakage in the received signal; and
means for receiving the reduced transmit leakage outputted from the receive analog-to-digital converter when the feedback receiver is not providing feedback about power levels of the transmitter.

29. The apparatus of claim 28, further comprising:
means for downconverting the feedback signal; and
means for filtering the downconverted feedback signal.

30. The apparatus of claim 28, further comprising means for passing the receive signal through the notch filter.

31. A non-transitory computer-readable medium having instructions thereon, the instructions comprising:
code for causing a wireless communication device to receive, by a receiver, a received signal;
code for causing the wireless communication device to provide periodic feedback about power levels of a transmitter;
code for causing the wireless communication device to provide a feedback signal to a feedback downconverter;
code for causing the wireless communication device to reuse a feedback receiver to tune circuitry to reduce transmit leakage in the received signal; the feedback receiver coupled between the transmitter and the receiver, the feedback receiver comprising a feedback low-noise amplifier coupled to the feedback downconverter, the feedback downconverter coupled to a feedback baseband filter, and the feedback baseband filter coupled to the receive analog-to-digital converter; and
code for causing the wireless communication device to receive in a notch filter coupled to a first amplifier the reduced transmit leakage outputted from the receive analog-to-digital converter when the feedback receiver is not providing feedback about power levels of the transmitter.

32. The non-transitory computer-readable medium of claim 31, wherein the instructions further comprise:
code for causing the wireless communication device to downconvert the feedback signal; and
code for causing the wireless communication device to filter the downconverted feedback signal.

33. The non-transitory computer-readable medium of claim 31, wherein the code for causing the wireless communication device to process the receive signal in the receiver comprise code for causing the wireless communication device to pass the receive signal through the notch filter.

* * * * *